United States Patent
Pinkerton

(10) Patent No.: US 6,854,292 B2
(45) Date of Patent: Feb. 15, 2005

(54) GLASS CONTAINER FORMING MACHINE

(75) Inventor: Steven J. Pinkerton, Avon, CT (US)

(73) Assignee: Emhart Glass S.A., Cham (CH)

( * ) Notice: Subject to any disclaimer, the term of this patent is extended or adjusted under 35 U.S.C. 154(b) by 495 days.

(21) Appl. No.: 10/005,393

(22) Filed: Dec. 5, 2001

(65) Prior Publication Data
US 2003/0101765 A1 Jun. 5, 2003

(51) Int. Cl.⁷ .................................................. C03B 9/41
(52) U.S. Cl. .............................. 65/159; 65/163; 65/260; 65/348; 198/468.2
(58) Field of Search .......................... 65/159, 163, 260, 65/348; 198/468.2

(56) References Cited

U.S. PATENT DOCUMENTS

| | | | | |
|---|---|---|---|---|
| 4,244,725 A | * | 1/1981 | Fenton ........................ 65/260 |
| 5,425,794 A | * | 6/1995 | Frederick et al. .............. 65/160 |
| 5,807,419 A | * | 9/1998 | Rodriguez-Wong et al. .. 65/229 |
| 5,814,119 A | * | 9/1998 | Jones et al. .................... 65/235 |
| 5,895,513 A | * | 4/1999 | Ciriello et al. ................. 65/159 |
| 5,904,745 A | * | 5/1999 | Nafziger et al. .............. 65/29.1 |
| 6,241,448 B1 | * | 6/2001 | Nicholas ................. 414/222.01 |
| 6,345,518 B1 | * | 2/2002 | Pinkerton ...................... 65/159 |
| 6,367,287 B1 | * | 4/2002 | Leidy et al. ................... 65/160 |
| 6,601,410 B1 | * | 8/2003 | Bogert et al. .................. 65/260 |

* cited by examiner

Primary Examiner—Sean Vincent
(74) Attorney, Agent, or Firm—Spencer T. Smith

(57) ABSTRACT

A takeout mechanism for an I.S. machine grips a formed bottle at the blow station and carries the bottle to a first position spaced above a deadplate. The bottle is held at this position for a period of time and then is lowered to a position proximate the deadplate whereupon it is released.

2 Claims, 2 Drawing Sheets

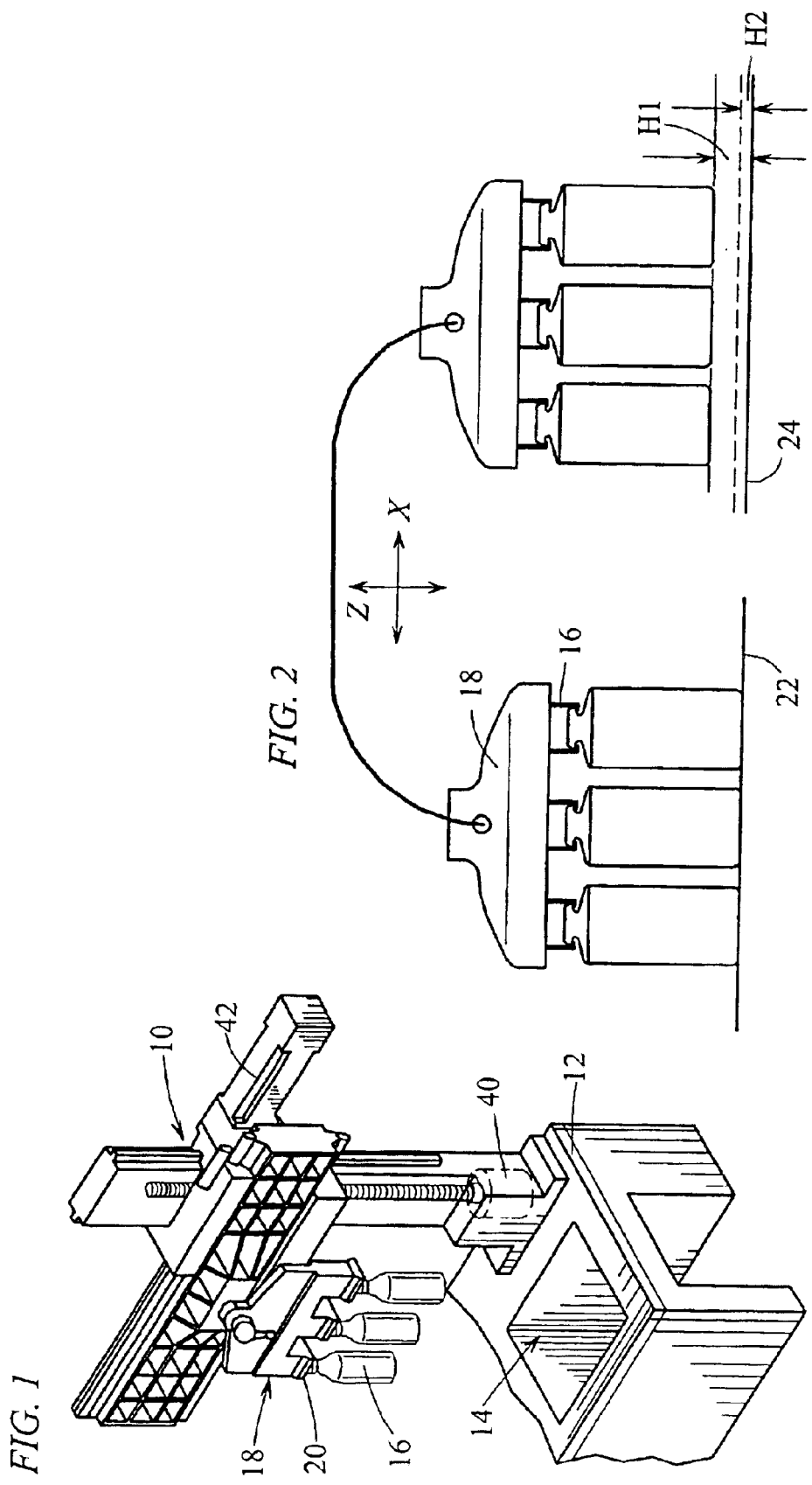

GLASS CONTAINER FORMING MACHINE

The present invention relates to an I.S. (individual section) type of glass container forming machine and more particularly to the takeout mechanism for that machine.

BACKGROUND OF THE INVENTION

In an I.S. machine, a bottle is formed in a two part blow mold and when it has been sufficiently cooled so that it can be moved, the blow mold parts open and a takeout mechanism grabs the bottle proximate the finish, lifts the bottle and carries it to a position suspended above a deadplate which is perforated to allow cooling air to blow upwardly against the entire bottom of the bottle, continuing the cooling process. When the bottom of the bottle has been sufficiently cooled the takeout mechanism releases the bottle dropping the bottle the distance it was held above the deadplate, onto the deadplate.

OBJECT OF THE INVENTION

It is accordingly an object of the present invention to provide an improved takeout mechanism.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

FIG. 1 is an oblique schematic showing of a takeout mechanism;

FIG. 2 is a side view showing the displacement of the takeout from the bottle pickup position to the bottle deposit position.

BRIEF DESCRIPTION OF THE PREFERRED EMBODIMENT

Figure 3:
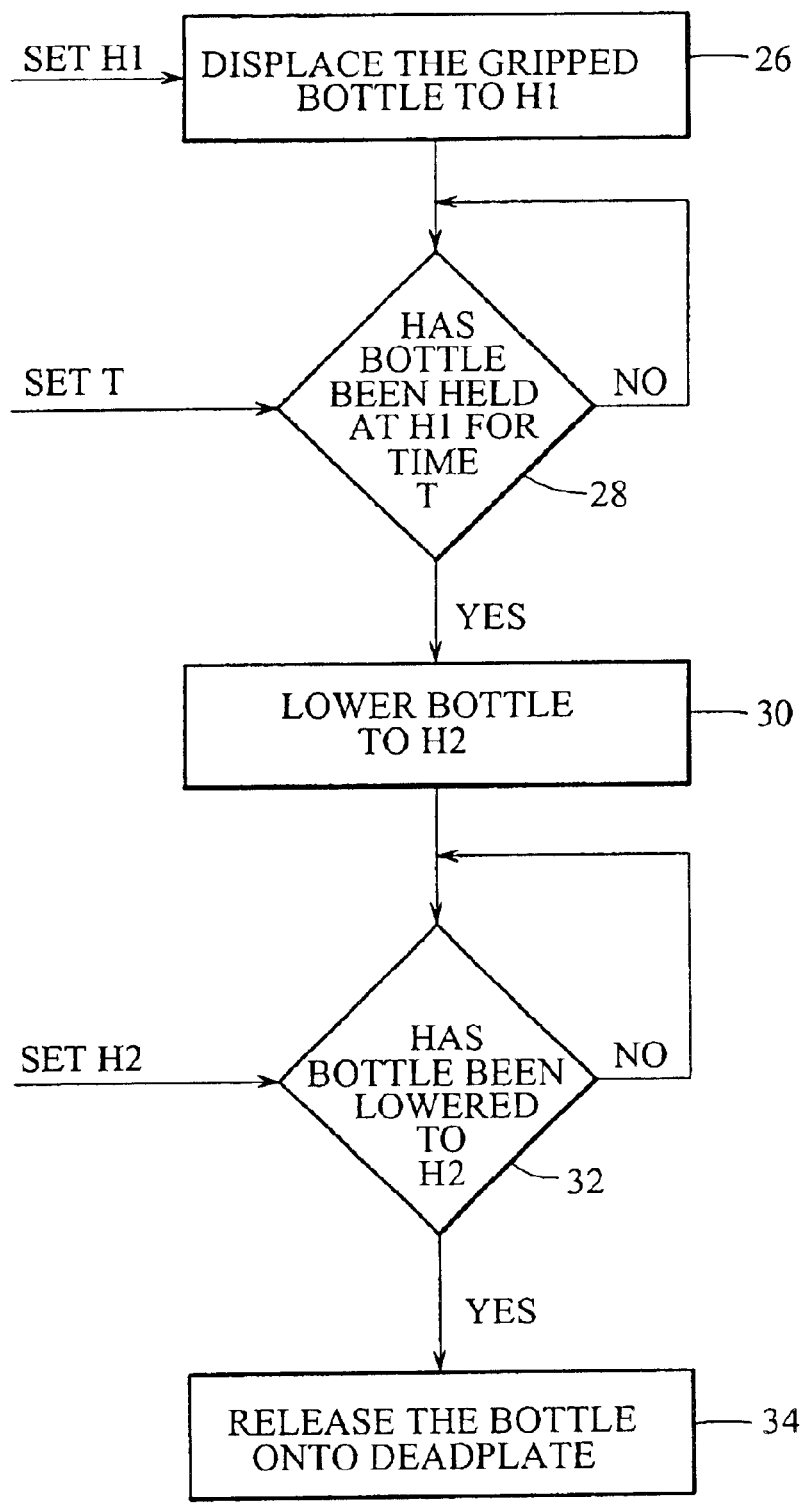
FIG. 3 is a logic diagram illustrating the operation of the control for this takeout displacement.

FIG. 1 illustrates a takeout mechanism 10 which is mounted on the section frame 12 of an I.S. machine proximate the blow station 14 where a parison (not shown), located within a pair of closed blow molds (also not shown), is blown into a bottle 16. U.S. Pat. No. 5,895,513, illustrates a conventional takeout mechanism. The takeout mechanism includes a tong arm 18 which supports a tong head 20 for each bottle produced at the blow station. In the illustration three bottles are held in three tong heads and the I.S. machine is accordingly operating triple gob.

As shown in FIG. 2, When the bottles have been sufficiently cooled, the blow molds will be opened so that each formed bottle sits on the bottom plate of the mold (schematically shown as line 22). The takeout is displaced over the formed bottles so that the tongheads can grip the bottles proximate the finish (the threaded, etc. top). The takeout control (FIG. 3) will then Displace The Gripped Bottle To H1 26 (a selected distance above a deadplate 24 which is selected to cool the bottom of the bottle as desired). Cooling air flows upwardly through holes in the deadplate to cool the bottom of the suspended bottles. When the bottoms have been sufficiently cooled (the query "Has Bottle Been Held At H1 For Time T" 28 is answered in the affirmative), the control will Lower Bottle To H2 30 (H2 is a distance above a deadplate 24 which is selected to be at or very close to the deadplate). When the control answers the query "Has Bottle Been Lowered To H2" 32 in the affirmative, the control will Release The Bottle Onto The Deadplate 34. As shown the control has inputs for H1, H2 and time T so that an operator can define the displacement for the particular bottle being produced.

As illustrated in FIG. 2, the takeout mechanism has vertical and horizontal displacement in a two axis mechanism with each mechanism controlled by a servomotor 40,42. Alternately the tong arm could be pivotally mounted and driven through an arc by a single servomotor.

What is claimed is:

1. A takeout mechanism for gripping a bottle formed at the blow station of an I.S. machine, displacing the bottle to a location proximate a deadplate and releasing the bottle onto the deadplate comprising a tong arm, a tong head secured to said tong arm for gripping a bottle, means including a control for displacing said tong arm from a first position whereat the bottle is gripped at the blow station to a second position a first selected distance above the deadplate, for holding said tong arm at said second position for a selected time, at the end of said selected time, displacing said tong arm downwardly toward the deadplate to a third position, and when said selected tong head is at said third position, releasing the bottle onto the deadplate.

2. A takeout mechanism for gripping a bottle formed at the blow station of an I.S. machine according to claim 1, wherein said third position is a predetermined spacing above the deadplate.

* * * * *